J. S. COTTER.
AUTOMOBILE HEADLIGHT CONTROLLING DEVICE.
APPLICATION FILED OCT. 11, 1911.

1,117,336.

Patented Nov. 17, 1914.

Witnesses
Edwin F. McKee
Mary C. Sheridan

Inventor
John S. Cotter
By Geo. W. Sues.
Attorney

UNITED STATES PATENT OFFICE.

JOHN SAMUEL COTTER, OF SABULA, IOWA.

AUTOMOBILE HEADLIGHT-CONTROLLING DEVICE.

1,117,336.  Specification of Letters Patent.  Patented Nov. 17, 1914.

Application filed October 11, 1911. Serial No. 654,097.

*To all whom it may concern:*

Be it known that I, JOHN S. COTTER, a citizen of the United States, and a resident of Sabula, in the county of Jackson and State of Iowa, have invented certain new and useful Improvements in Automobile Headlight-Controlling Devices, of which the following is a specification, reference being had to the accompanying drawings.

This invention relates to automobile headlight controlling devices and aims primarily to provide a device which may be readily applied to any type of automobile without alteration of the machine itself, and will automatically operate to turn the headlights to direct their rays of light in the true line of travel of the machine. In this manner, the device embodying the present invention is designed to avoid accidents liable to occur at turns in the road over which the machine is traveling, due to the inability of the operator of the machine to see objects directly in front thereof. Not only does the invention contemplate the provision of a device of this type which may be readily applied to any ordinary automobile without alteration of the latter, but it also aims to provide such a device which will not be subjected to strain when the body of the automobile yields upwardly and downwardly upon its supporting springs, or moves forwardly or rearwardly with relation to its front-supporting axle. Most devices of this type are open to this objection for the reason that the movement of the body of the automobile relative to the axles jars the lamps or headlights to such an extent as to render the light uncertain. This objection is, however, overcome in the present invention by the provision of a connection between the steering mechanism of the automobile and the headlight supports which will compensate for relative movement of the body and supporting frame and axles of the automobile.

With these and other objects in view the present invention consists in the combination and arrangement of parts as will be hereinafter more fully described and finally pointed out in the appended claims, it being further understood that changes in the specific structure shown and described may be made within the scope of the claims, without departing from the spirit of the invention.

Figure 1:
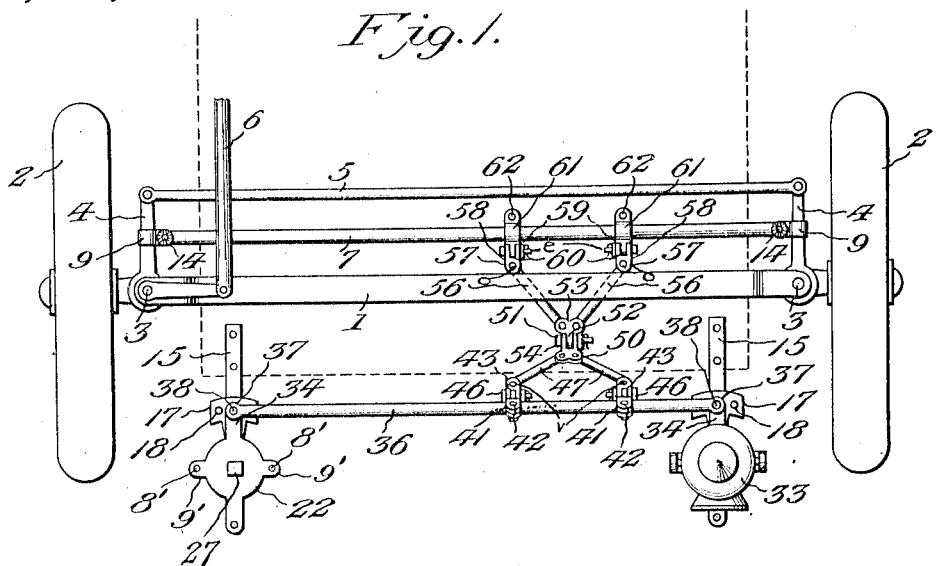
Figure 2:
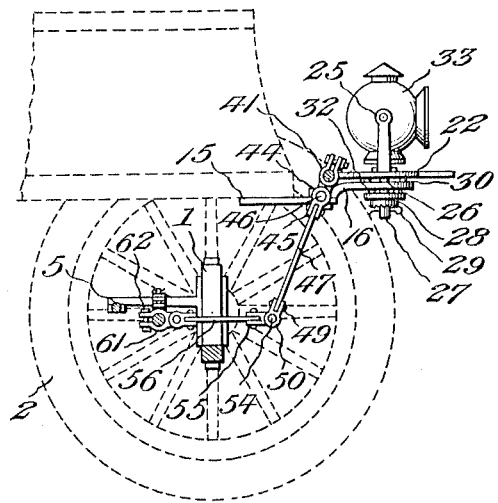
Figure 3:
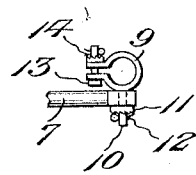
Figure 4:
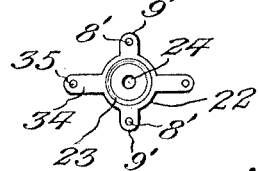
Figure 5:
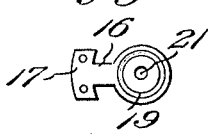

In the accompanying drawings forming a part of this specification and in which like numerals of reference indicate similar parts in the several views: Figure 1, is a top plan view of the device embodying the present invention applied to the fore part of an automobile. Fig. 2, is a central sectional view through Fig. 1. Fig. 3, is a detail view in elevation of one of the clamping collars attached to the steering mechanism of the automobile. Fig. 4, is a top plan view of one of the headlight supports. Fig. 5, is a similar view of one of the lamp heads, upon which the headlight support is mounted.

In the drawings there are shown only such parts of an automobile as those to which the device is directly related or applied. The front axle of the automobile is indicated by the numeral 1, and the supporting wheels at the ends thereof by the numeral 2. The spindles for the wheels 2 are carried by the usual steering knuckles 3, the arms of which are indicated by the numeral 4. The usual correcting rod 5, extends between and connects the ends of the steering knuckle arms 4, as shown in Fig. 1, of the drawings, and connected to one of the said knuckles in the usual manner is a steering rod 6.

The device embodying the present invention includes a carrying bar 7, which is provided at each end with a suitable opening to receive the studs 10, as shown in Fig. 3, of the drawings, each of which forms part of a split collar 9. These members serve to pivotally support the respective ends of the carrying bar. The lower ends of the studs 10, are threaded and a nut 11, is fitted upon each stud and is held in place by means of a cotter pin or like element 12, secured through the stud. Each nut 11, has an outer ratchet face, engaged by the connected cotter pin. The split collars 9, are fitted upon the steering forks 4, in the manner shown in Fig. 1, of the drawings and are clamped to the said forks by means of bolts 13, secured through the collar ends, as shown in Fig. 3. The bolts 13, are provided with a nut locking device, as indicated by the numeral 14, including a ratchet faced nut and being identical in construction with the device previously described for locking the nuts 11 in place.

The headlight supports include brackets which are indicated by the numeral 15, and are of the ordinary construction, there being two such brackets, one located at each side of the front of the automobile. Upon the outer end of each bracket 15, there is fixed a head 16, which is substantially circular in outline and is provided with an attaching portion 17, shown in Fig. 5, secured by means of a bolt or bolts 18, to the said bracket 15. This head is formed in its upper face with a ball race 19, and in its under face with a similar ball race, not shown. The said head is also formed with a stud opening 21, centrally located as shown in Fig. 5, of the drawings.

The lamp or headlight supporting base of the device is indicated by the numeral 22, and, as shown in Fig. 4, of the drawings, consists of a plate formed with a ball race 23, in its underside, and with a centrally located bolt opening 24. The lamp supporting forks are indicated by the numeral 25, each fork ending in a threaded stud 26, arranged to pass through the openings 8', within the ears 9'. In mounting the plates 22, upon the respective heads 16, a bolt 27, shown in Fig. 1, is passed through the openings 21 and 24, in the said heads and the plates 22, respectively, and a ratchet faced nut 28, is threaded upon each of the bolts 27, and is locked in place by means of a cotter pin 29, secured through the respective bolt, as shown in Fig. 2, of the drawings. Bearing balls 30, are arranged in the upper race in the head 16, and the underside of each plate 22. A washer 31, is arranged upon each of the bolts 27, and each washer is formed in its upper face with a ball race in which, and a similar race in the underside of the respective head 16, are arranged bearing balls 32. The headlights are indicated by the numeral 33, and are supported upon the forks 25, in the usual manner.

Each of the headlight supporting plates 22, is provided with a forwardly extending ear 34, formed with an opening 35, and a coupling bar 36, is provided at its ends with spaced ears 37, which straddle the said ears of the plates 22. Bolts 38, are passed through the openings in the ears 37, and the ears 34, of the plates 22, which they straddle and suitable nuts are threaded upon the said bolts and are held against backward turning by means of cotter pins secured through the said bolts, in the manner described. In this manner, the two headlight supporting plates are connected for simultaneous turning movement.

Collars 41, are clamped by means of bolts 42, upon the coupling bar 36, as shown in Fig. 1, of the drawings, and each of these collars is formed with an ear 43, which projects rearwardly therefrom, as shown in the said figure. Each of the ears 43, is received between spaced ears 44, formed upon a coupling head 45, and a pivot bolt 46, is secured through the said ears and supports the respective coupling head 45, for vertical swinging movement. An auxiliary rod 47, is pivoted at its front end to each of the heads 45, the rear ends of the rods 47, being pivotally connected as at 49, to a knuckle 50, which is provided with spaced ears 51, between which is pivoted an ear 52, formed at the forward side of a main knuckle 53, the pivot being in the nature of a bolt 54, passed through the said ears 51 and 52. The main knuckle 53, is formed at its rear with spaced pairs of ears 55, shown in Fig. 2, and between each pair of ears there is pivoted the forward end of a rod 56, which at its rear end is pivoted upon a pin $e$ between ears 57, formed upon a coupling head 58. Each of the heads 58, is formed with ears 59, between which is pivoted an ear 60, formed upon a split collar 61, held adjustably upon the rod 7, by means of bolts 62. Each head 58 is secured to its bar 56 by means of a pin $o$, while each rod 47 is held upon a pin $v$.

From the foregoing description of the invention, it will be readily understood that the collars 41 and 61, may be adjusted upon the rods 7 and 36, respectively, so as to adapt the device for application to automobiles in which the two said rods must be positioned a greater or less distance apart. Furthermore, it will be observed from an inspection of Fig. 2, of the drawings that the rod 36, is located above the rod 7, so that the body of the machine may yield upwardly and downwardly as well as forwardly and backwardly upon its supporting springs without in any way affecting the headlight supporting plates of the device. Also it will be understood from the foregoing that when the rod 7, is shifted laterally in either direction, the connecting rod 36, will be shifted in the same direction, thereby turning the headlight supporting plates so as to direct the rays of light in the true line of travel of the machine. Any up and down movement is compensated in part by the resilient bars 56, shown in Fig. 2, so that the instrumentalities will not be strained when the automobile is jolted.

Having thus described my said invention, what I claim as new and desire to secure by United States Letters Patent is:

1. The combination with a rod connecting the steering knuckles of an automobile, of two collars secured to said rod, a coupling head pivotally secured to each collar, a rod extending from each head, a main knuckle receiving the ends of said rods, an auxiliary knuckle pivotally secured to said main knuckle, two pivotally supported lamp receiving plates, a coupling bar connecting said plates, two collars secured to said coupling bar, a coupling head secured to each of said last mentioned collars, and a rod extending from each last mentioned coupling head to said auxiliary knuckle.

2. The combination with the rod connecting the steering knuckles of an automobile, of two collars secured to said rod, a coupling head pivotally secured to each collar, a rod extending from each head, a main knuckle receiving the ends of said rods, an auxiliary knuckle pivotally secured to said main knuckle, two pivotally supported lamp receiving plates each having a rearwardly extending ear, a coupling bar connecting said ears, two collars secured to said coupling bar, a coupling head secured to each of said last mentioned collars, and a rod extending from said last mentioned coupling head to said auxiliary knuckle.

3. The combination with an automobile body and the rod connecting its steering knuckles, of brackets extending from said body, a pivotally supported lamp receiving plate secured to each bracket, a coupling bar connecting said plates, two collars secured to said coupling bar, a coupling head secured to each of said last mentioned collars, of two collars secured to said connecting rod, a coupling head pivotally secured to each last mentioned collar, a rod extending from each last mentioned head, a main knuckle receiving the ends of said last mentioned rods, an auxiliary knuckle pivotally secured to said main knuckle, and rods extending from said first mentioned coupling heads to said auxiliary knuckle, substantially as described.

In testimony whereof I affix my signature, in presence of two witnesses.

JOHN SAMUEL COTTER.

Witnesses:
W. E. NEWSOME,
WALTER W. WHITNEY.

Copies of this patent may be obtained for five cents each, by addressing the "Commissioner of Patents, Washington, D. C."